(12) United States Patent
Okawa et al.

(10) Patent No.: US 9,532,203 B2
(45) Date of Patent: Dec. 27, 2016

(54) TELEMATICS CONTROLLER, VEHICLE, AND TELEMATICS CONTROL METHOD

(71) Applicant: Clarion Co., Ltd., Saitama-shi, Saitama (JP)

(72) Inventors: Akihiro Okawa, Yoshikawa (JP); Miho Kanamori, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 14/761,438

(22) PCT Filed: Aug. 22, 2013

(86) PCT No.: PCT/JP2013/072428
§ 371 (c)(1),
(2) Date: Jul. 16, 2015

(87) PCT Pub. No.: WO2014/112149
PCT Pub. Date: Jul. 24, 2014

(65) Prior Publication Data
US 2015/0358798 A1  Dec. 10, 2015

(30) Foreign Application Priority Data

Jan. 17, 2013  (JP) .................. 2013-006755

(51) Int. Cl.
*H04M 11/04* (2006.01)
*H04W 4/22* (2009.01)
(Continued)

(52) U.S. Cl.
CPC .............. *H04W 4/22* (2013.01); *H04B 1/082* (2013.01); *H04B 1/3816* (2013.01); *H04L 67/12* (2013.01);
(Continued)

(58) Field of Classification Search
CPC ....... H04W 4/22; H04W 4/046; H04B 1/3816; H04B 1/082; G08G 1/205
(Continued)

(56) References Cited

U.S. PATENT DOCUMENTS 7,003,319 B1  2/2006  Howell et al.
7,991,381 B1  8/2011  Dunne et al.
(Continued)

FOREIGN PATENT DOCUMENTS

GB  2 336 507 A  10/1999
JP  2000-299642 A  10/2000
(Continued)

OTHER PUBLICATIONS

International Search Report (PCT/ISA/210) dated Nov. 5, 2013 with English-language translation (four (4) pages).
(Continued)

*Primary Examiner* — Dhaval Patel
(74) *Attorney, Agent, or Firm* — Crowell & Moring LLP

(57) ABSTRACT

An object of the present invention is to enable a SIM interface to be selected more appropriately. A telematics controller according to the present invention includes a vehicle information collecting unit that collects vehicle information about a vehicle mounted with the telematics controller, a SIM switching unit that enables one of a plurality of SIM interfaces to communicate, and a switching instructing unit that instructs the SIM switching unit to switch the SIM interface to a SIM interface associated in advance according to the vehicle information collected by the vehicle information collecting unit.

8 Claims, 13 Drawing Sheets

(51) Int. Cl.
*H04B 1/08* (2006.01)
*H04B 1/3816* (2015.01)
*H04W 4/04* (2009.01)
*H04W 76/00* (2009.01)
*H04L 29/08* (2006.01)
*H04W 8/18* (2009.01)
*G08G 1/00* (2006.01)

(52) U.S. Cl.
CPC ............... *H04W 4/046* (2013.01); *H04W 8/18* (2013.01); *H04W 76/007* (2013.01); *G08G 1/205* (2013.01)

(58) Field of Classification Search
USPC ....... 455/404.2, 411, 558, 456.1, 466, 404.1, 455/426.2; 340/4.61, 870.02; 701/1, 29.3
See application file for complete search history.

(56) References Cited

U.S. PATENT DOCUMENTS 8,781,442 B1 * 7/2014 Link, II ................. G08G 1/205
370/338

2002/0154632 A1 10/2002 Wang et al.
2011/0287733 A1 11/2011 Cepuran et al.

FOREIGN PATENT DOCUMENTS

| JP | 2002-345046 A | 11/2002 |
| JP | 2009-124279 A | 6/2009 |
| WO | WO 2011/041913 A1 | 4/2011 |

OTHER PUBLICATIONS

Japanese-language Written Opinion (PCT/ISA/237) dated Nov. 5, 2013 (three (3) pages).
"NXP automotive telematics on-board unit platform—A standard approach to eCalling," Jun. 30, 2008, http://www.nxp.com/documents/leaflet/75016563.pdf, XP055291063 (two (2) pages).
Extended European Search Report issued in counterpart European Application No. 13871776.4 dated Aug. 4, 2016 (nine (9) pages).

* cited by examiner

TELEMATICS CONTROLLER, VEHICLE, AND TELEMATICS CONTROL METHOD

TECHNICAL FIELD

The present invention relates to a telematics control technique. The present invention claims priority to Japanese Patent Application No. 2013-6755, filed on Jan. 17, 2013, the entire contents of which are incorporated herein by reference for the designated countries where incorporation of documents by reference is approved.

BACKGROUND ART

Conventionally, there is a technique of switching a Subscriber Identity Module (SIM) card used on the basis of charges. Patent Literature 1 discloses a technique for such a device.

CITATION LIST

Patent Literature

Patent Literature 1: JP 2002-345046 A

SUMMARY OF INVENTION

Technical Problem

In the technique described above, in a case where a SIM card used for communication is selected from a plurality of SIM cards, the SIM card is selected using charge information for the purpose of suppressing communication charges to be inexpensive. However, in a case where a SIM card having a restriction in an available situation is included as a selection target, the SIM card may not actually be in an available situation, and as a result, the selected SIM card may not be appropriate.

An object of the present invention is to provide a technique enabling a SIM interface to be selected more appropriately.

Solution to Problem

In order to solve the above problem, a telematics controller according to the present invention includes: a vehicle information collecting unit that collects vehicle information about a vehicle mounted with the telematics controller; a SIM switching unit that enables one of a plurality of SIM interfaces to communicate; and a switching instructing unit that instructs the SIM switching unit to switch the SIM interface to a SIM interface associated in advance according to the vehicle information collected by the vehicle information collecting unit.

In addition, a vehicle according to the present invention includes a vehicle information collecting unit that collects vehicle information, a SIM switching unit that enables one of a plurality of SIM interfaces to communicate, and a switching instructing unit that instructs the SIM switching unit to switch the SIM interface to a SIM interface associated in advance according to the vehicle information collected by the vehicle information collecting unit.

In addition, a telematics control method according to the present invention is a telematics control method based on a telematics controller which includes a SIM switching unit that enables one of a plurality of SIM interfaces to communicate, and includes a vehicle information collecting step of collecting vehicle information, and a switching instructing step of instructing the SIM switching unit to switch the SIM interface to a SIM interface associated in advance according to the vehicle information collected in the vehicle information collecting step.

Advantageous Effects of Invention

According to the present invention, it is possible to provide a technique enabling a SIM interface to be selected more appropriately.

DESCRIPTION OF EMBODIMENTS

Hereinafter, a telematics control according to a first embodiment of the present invention will be described with reference to the drawings.

Figure 1:
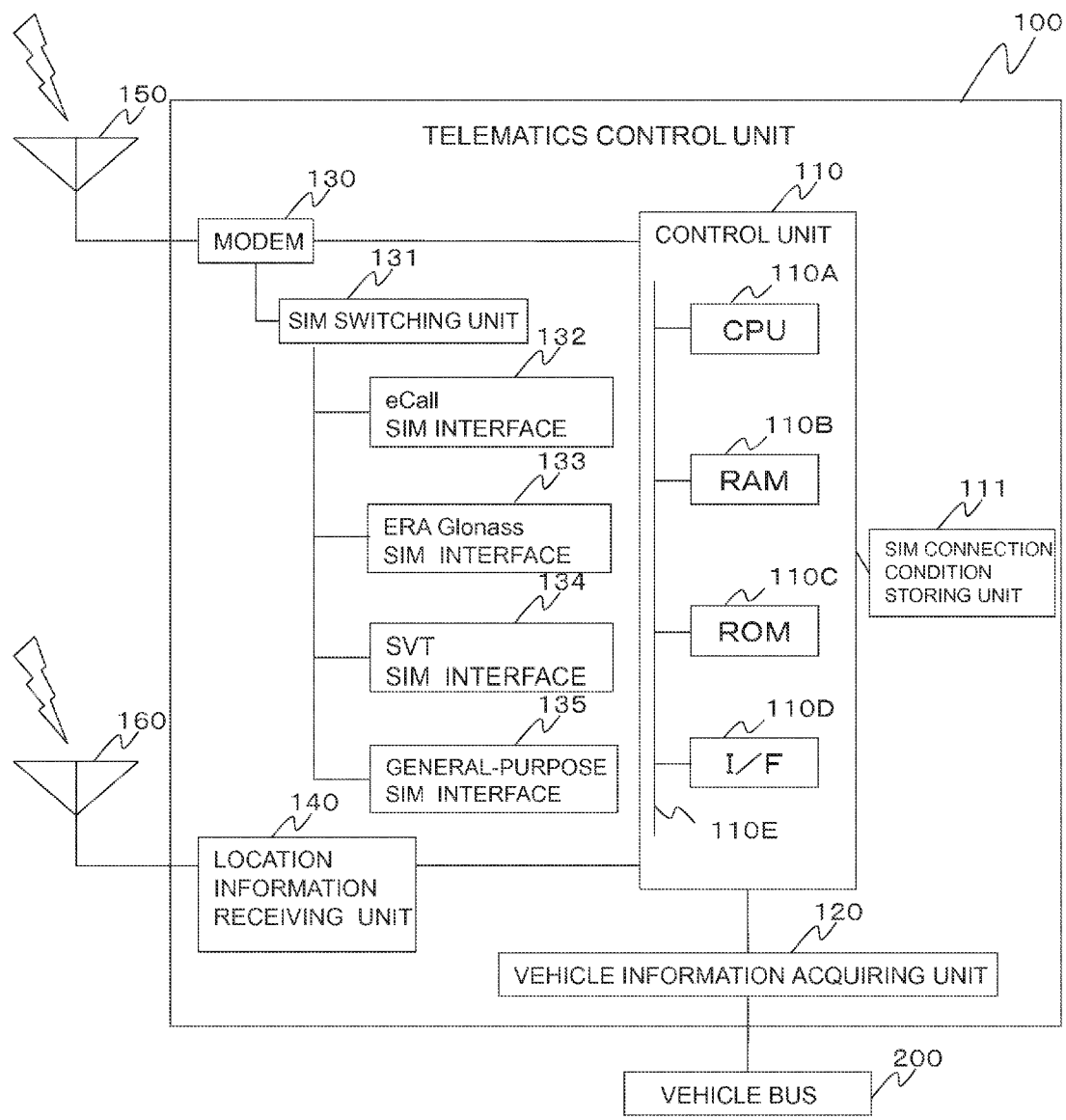
FIG. 1 is a diagram schematically illustrating a configuration of a telematics control unit according to a first embodiment.

FIG. 1 illustrates an overall configuration of a telematics control unit 100. The telematics control unit 100 includes a control unit 110, a SIM connection condition storing unit 111, a vehicle information acquiring unit 120, a modem 130, a SIM switching unit 131, an eCall SIM interface 132, an ERA Glonass SIM interface 133, an Stolen Vehicle Tracking (SVT) SIM interface 134, a general-purpose SIM interface 135, and a location information receiving unit 140. In addition, the telematics control unit 100 is installed in a vehicle.

The control unit 110 is a central unit that performs various processes of the telematics control unit 100. For example, a SIM interface to be used is selected according a vehicle situation of a vehicle mounted with the telematics control unit 100. In addition, the start/end of communication using the SIM interface is controlled. In addition, in a case where interruption to a SIM interface having a low priority occurs, a line of the SIM interface is controlled. In other words, the control unit 110 instructs the SIM switching unit 131 to enable the SIM interface associated to a situation in advance in order to communicate according to the collected vehicle information.

Figure 2:
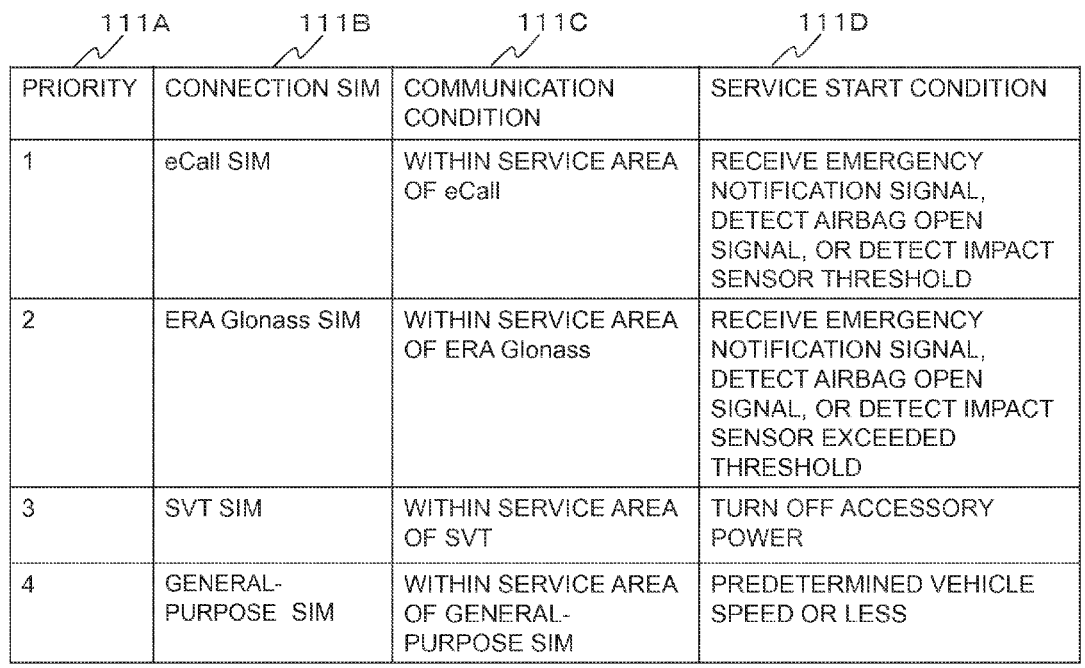
FIG. 2 is a diagram illustrating a data structure of a SIM connection condition storing unit.

As illustrated in FIG. 2, the SIM connection condition storing unit 111 stores information including priority 111A specifying priority, a SIM communication condition 111C, and a service start condition 111D, for each connection SIM 111B specifying a connected SIM interface. In addition, the SIM interface is not limited to a SIM card, and another SIM chip having the same function as that of the SIM card may be employed.

In the SIM connection condition storing unit 111, for example, priority "1" is associated with an eCall SIM interface for emergency support, communication is validated within a service area of eCall, and it is stored that an emergency support service of eCall should start, when an emergency notification signal is received, when a signal specifying that an airbag is opened is detected, or when it is detected that an output of a predetermined impact sensor exceeds a threshold value.

In addition, for example, in the SIM connection condition storing unit 111, priority "2" is associated with an ERA Glonass SIM interface for emergency support, communication is validated within a service area of ERA Glonass, and it is stored that an emergency support service of ERA Glonass should start, when an emergency notification signal is received, when a signal specifying that an airbag is opened is detected, or when it is detected that an output of a predetermined impact sensor exceeds the threshold value.

In addition, for example, in the SIM connection condition storing unit 111, priority "3" is associated with an SVT SIM interface for stolen vehicle tracking, communication is validated within a service area in the range of SVT, and it is stored that an emergency support service of SVT should start when it is detected that an accessory power of a vehicle mounted with the subject unit is turned off.

In addition, for example, in the SIM connection condition storing unit 111, priority "4" is associated with a general-purpose SIM interface including a user SIM interface independently contracted by a user and a car maker SIM interface provided by a car maker, communication is validated within a service area of the general-purpose SIM interface, and it is stored that an individual service should start using the general-purpose SIM interface, such as transmitting information about a vehicle (including an error history and an operation history of the vehicle) to a predetermined server, when a speed of a vehicle mounted with the subject unit is equal to or lower than a predetermined value.

The vehicle information acquiring unit 120 is connected to a vehicle bus 200 constituting a vehicle-mounted network such as a Controller Area Network (CAN), and acquires and stores information about a vehicle state.

The modem 130 is connected to the SIM interface and an antenna 150 communicating with the other devices through a wireless network, and performs a process such as modulation and demodulation necessary for the communication.

The SIM switching unit 131 controls the connection between various kinds of SIM interfaces and the modem 130 to be electrically switched. In other words, the SIM switching unit 131 is a SIM switching unit enabling one of the plurality of SIM interfaces to communicate.

The eCall SIM interface 132 is a SIM interface for an eCall system communicating for emergency support mainly in regions such as Europe.

The ERA Glonass SIM interface 133 is a SIM interface for an ERA Glonass system communicating for emergency support mainly in regions such as Russia.

The SVT SIM interface 134 is a SIM interface for an SVT system communicating for stolen vehicle tracking in regions such as Europe and Brazil.

The general-purpose SIM interface 135 includes a car maker SIM interface provided by a car maker and a user SIM interface which users independently have.

The location information receiving unit 140 is connected to an antenna 160 for receiving location information, measures a location according to electric waves received by the antenna 160 from an artificial satellite, and transmits and receives information of latitude and longitude specifying the measured location to and from the control unit 110.

In addition, a network connected by the antenna 150 is a wireless network such as a mobile phone network, a public network, a Local Area Network (LAN), or a Wide Area Network (WAN). In addition, the location information received by the antenna 160 is information about a Global Positioning System (GPS) system, but the present invention is not limited thereto, and the location information may be information about a Global Navigation Satellite System (Glonass) system, or may be information received from any one of the GPS and the Glonass.

The control unit 110 of the telematics control unit 100 has a configuration in which devices are connected through a bus 110E. The control unit 110 includes a Central Processing Unit (CPU) 110A that performs various processes such as a numerical operation and a control of devices, a Random Access Memory (RAM) 110B that stores data read from the SIM connection condition storing unit 111, a Read Only Memory (ROM) 110C that stores programs and data, and an interface (I/F) 110D for connecting various kinds of hardware units to the control unit 110.

The SIM connection condition storing unit 111 includes a storage medium which is at least readable such as a Hard Disk Drive (HDD) and a nonvolatile memory card.

A CPU 110A reads and executes a predetermined program to construct the control unit 110. For this reason, programs for realizing processes of functional units are stored in the RAM 110B and the ROM 110C.

In addition, the constituent elements described above are mainly classified according to processing contents in order to help with understanding on the configuration of the telematics control unit 100. Therefore, the present invention is not limited by the method of classifying the constituent elements or the names thereof. The configuration of the telematics control unit 100 may be classified into more constituent elements according to the processing contents. In addition, the classification may be made such that one constituent element performs many processes.

In addition, the control unit 110 may be constructed by hardware units (ASIC, GPU, and the like). In addition, each process may be performed by one hardware unit, or may be performed by a plurality of hardware units.

[Description of Operation]

Figure 3:
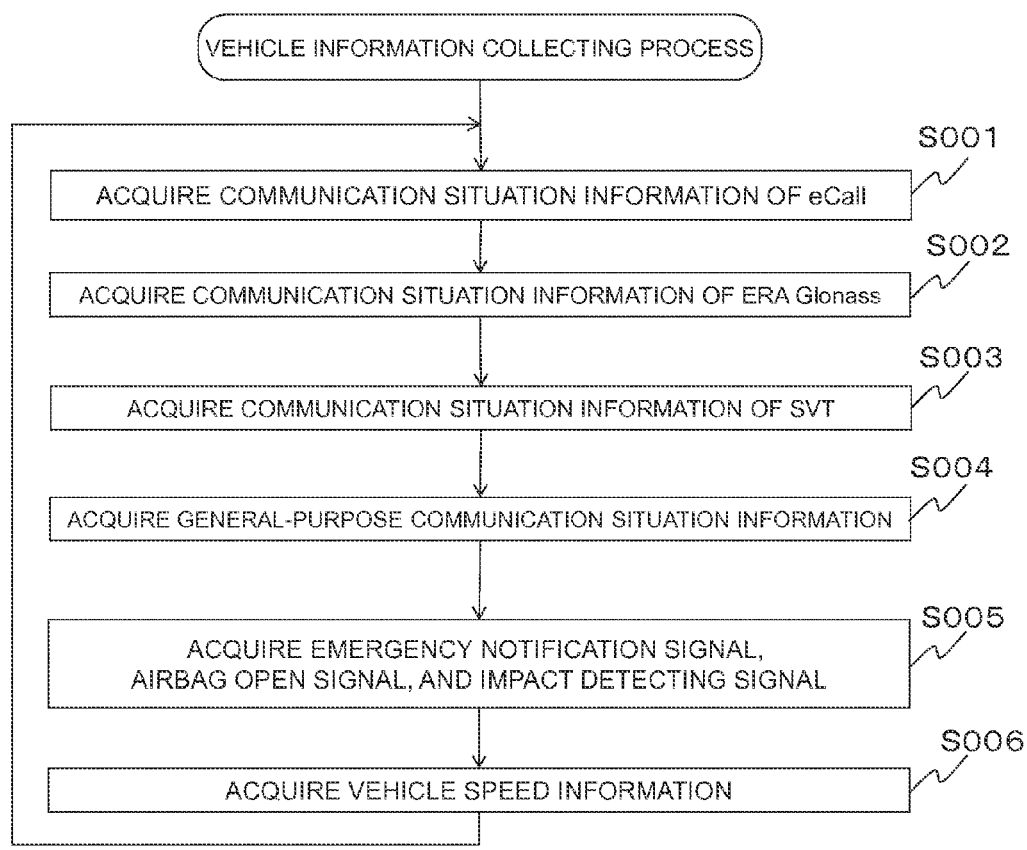
FIG. 3 is a diagram illustrating a flow of a vehicle information collecting process.

Next, an operation of a vehicle information collecting process performed by the telematics control unit 100 will be described. FIG. 3 is a flowchart illustrating a flow of a vehicle information collecting process performed by the telematics control unit 100. This flow is performed at a proper time period, for example, at a regular time period, after the other devices connected to the telematics control unit 100 and the vehicle bus 200 are operated to some extent.

First, the control unit 110 acquires information specifying a communication situation of eCall (Step S001). Specifically, the control unit 110 requests and acquires information on whether it is within a communication area for the eCall SIM interface 132 together with a degree of electric wave intensity thereof.

The control unit 110 acquires information about a communication situation of ERA Glonass (Step S002). Specifically, the control unit 110 requests and acquires information on whether it is within a communication area for the ERA Glonass SIM interface 133 together with a degree of electric wave intensity thereof.

The control unit 110 acquires information about a communication situation of SVT (Step S003). Specifically, the control unit 110 requests and acquires information on whether it is within a communication area for the SVT SIM interface 134 together with a degree of electric wave intensity thereof.

The control unit 110 acquires information about a communication situation based on general-purpose SIM (Step S004). Specifically, the control unit 110 requests and acquires information on whether it is within a communication area for the general-purpose SIM interface 135 together with a degree of electric wave intensity thereof.

The vehicle information acquiring unit 120 acquires whether an emergency notification signal is generated, whether an airbag open signal specifying that an airbag is open is generated, and whether an impact detection signal of an impact sensor is generated (Step S005). Specifically, the vehicle information acquiring unit 120 monitors various kinds of signal information transmitted through the vehicle bus 200, specifies information on whether each predetermined signal described above is transmitted through the vehicle bus 200 within a predetermined period, and records the information in a predetermined buffer recording area.

The vehicle information acquiring unit 120 acquires vehicle speed information (Step S006). Specifically, the vehicle information acquiring unit 120 acquires vehicle speed information transmitted through the vehicle bus 200, and records the vehicle speed information in a predetermined buffer recording area on the RAM 110B.

The above description has been made about the operation of the vehicle information collecting process. According to the vehicle information collecting process, it is possible to acquire information representing the situation of the vehicle which is the base of determination on whether to select which SIM interface at every regular time. That is, a vehicle method acquiring unit may be a vehicle information collecting device that collects vehicle information specifying a situation of a vehicle mounted with the subject unit.

Figure 4:
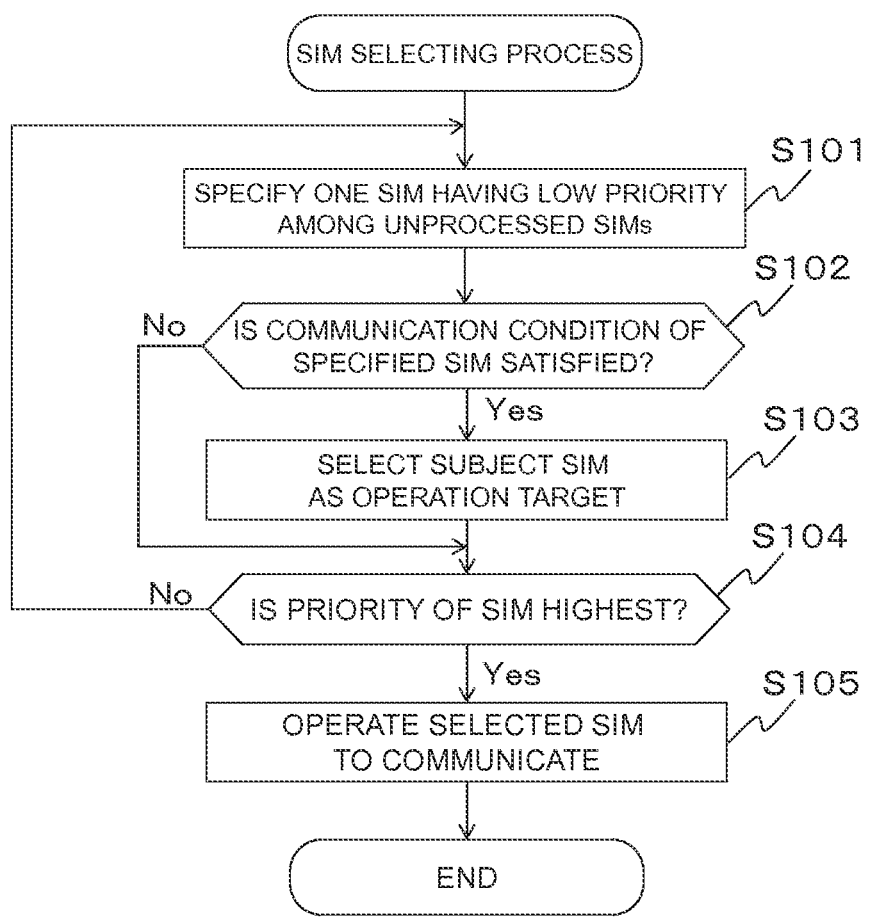
FIG. 4 is a diagram illustrating a flow of a SIM selecting process.

FIG. 4 is a flowchart illustrating a flow of a SIM selecting process performed by the telematics control unit 100. This flow is performed at a proper time period, for example, at a regular time period, after the other devices connected to the telematics control unit 100 and the vehicle bus 200 are operated to some extent.

First, the control unit 110 specifies one SIM interface having a low priority of unprocessed SIM interfaces (Step S101). Specifically, the control unit 110 specifies an unprocessed connection SIM 111B having low priority 111A with reference to the SIM connection condition storing unit 111.

The control unit 110 determines whether a communication condition of the specified SIM interface is satisfied (Step S102). Specifically, the control unit 110 reads a communication condition 111C of the SIM interface specified in Step S101 from the SIM connection condition storing unit 111, and determines whether the information collected in the vehicle information collecting process satisfies the communication condition 111C. In a case where the information does not satisfy the communication condition 111C, the process proceeds to Step S104 as described below.

In a case where the communication condition of the specified SIM interface is satisfied (Yes in Step S102), the control unit 110 selects the SIM interface as an operation target (Step S103). The process proceeds to Step S104.

The control unit 110 determines whether priority of the specified SIM interface corresponds to the SIM interface having the highest priority (Step S104). Specifically, the control unit 110 determines whether the connection SIM 111B having the priority 111A higher than that of the SIM interface specified in Step S101 is stored in the SIM connection condition storing unit 111. Then, in a case where it is determined that the connection SIM having the high priority 111A is stored, the control unit 110 determines that the priority is not the highest, and the process is returned to Step S101.

In a case where the priority of the specified SIM corresponds to the SIM interface having the highest priority (Yes in Step S104), the control unit 110 operates the SIM interface lastly selected as the operation target to communicate (Step S105). Specifically, the control unit 110 controls the SIM switching unit 131 to connect the SIM interface lastly selected as the operation target to the modem 130. The control unit 110 instructs the SIM interface as the operation target to transmit information for registering the location information acquired by the location information receiving unit 140 to a network connected to the SIM interface lastly selected as the operation target.

In addition, in a case where any SIM interface as the operation target is not selected, the control unit 110 may operate the SIM interface having the highest priority as the operation target.

The above description has been made about the operation of the SIM selecting process. According to the SIM selecting process, in a case where the information specifying the vehicle state satisfies the predetermined communication condition, the SIM interface having a high priority can be operated to communicate. That is, the control unit 110 specifies a SIM interface for which the present location specified by the vehicle information is included in the service available area, and may enable the specified SIM interface to communicate. In addition, the control unit 110 specifies a SIM interface communicating with a high priority in communication based on the SIM interface for which the present location specified by the vehicle information is included in the service available area, and may enable the specified SIM interface to communicate.

Figure 5:
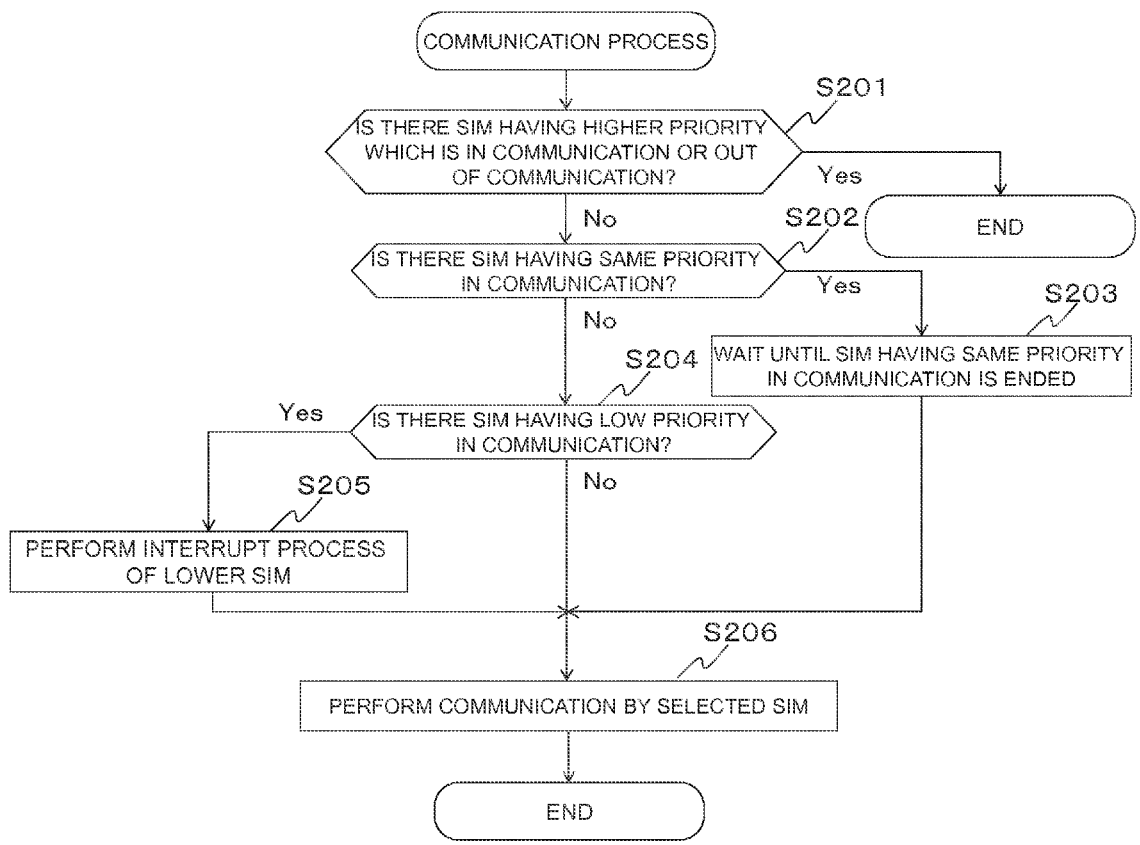
FIG. 5 is a diagram illustrating a flow of a communication process.

FIG. 5 is a flowchart illustrating a flow of a communication process performed by the telematics control unit 100. The SIM interface for which the vehicle information satisfies the service start condition 111D is selected by the control unit 110, and this flow is started at a proper time after the other devices connected to the telematics control unit 100 and the vehicle bus 200 are operated to some extent and after the SIM interface is operated to communicate by the SIM selecting process.

First, the control unit 110 determines whether there is a higher SIM interface which is in communication or is out of communication (Step S201). Specifically, the control unit 110 determines, for the SIM interface having a priority higher than the SIM interface operated to communicate, whether a state where communication was ended within a predetermined time from the time of a process time point or a state of being communicating at a process time point. In a case of any one state, the control unit 110 ends the communication process. It is not a situation where communication in the SIM interface having a lower priority is positively necessary, that is, it is because an accident or stealing may be occurring.

In a case where there is no higher SIM interface which is in communication or is out of communication (No in Step S201), the control unit 110 determines whether there is a SIM interface having the same priority in communication (Step S202). Specifically, the control unit 110 determines whether there is a SIM interface which is in communication at the process time point and has the exactly same priority.

In a case where there is the SIM interface having the same priority in communication (Yes in Step S202), the control unit 110 waits until the communication of the SIM interface having the same priority in communication is ended (Step S203). When the communication of the SIM interface having the same priority in communication is ended, the control unit 110 makes the process proceed to Step S206 as described below.

In a case where there is no SIM interface having the same priority in communication (No in Step S202), the control unit 110 determines whether there is a low SIM interface which is in communication (Step S204). Specifically, the control unit 110 determines whether there is a SIM interface having the lower priority in communication at the process time point.

In a case where there is no lower SIM interface which is in communication (No in Step S204), the control unit 110 makes the process proceed to Step S206 as described below.

In a case where there is the lower SIM interface which is in communication (Yes in Step S204), the control unit 110 performs an interrupt process to the lower SIM interface as described below (Step S205). The control unit 110 makes the process proceed to Step S206 as described below.

The control unit 110 performs communication based on the selected SIM interface (Step S206).

The above description has been made about the operation of the communication process. According to the communication process, the telematics control unit 100 does not perform the communication process using the lower SIM interface in a case where the higher SIM interface is out of communication or in communication. In addition, when the SIM interface having the same priority is in communication, it waits for the end of the communication based on the SIM interface in communication, and starts the communication. In addition, when the lower SIM interface is in communication, the communication is started through the interruption. In such a manner, since the communication based on the SIM interface having a higher priority comes first, the communication of the higher SIM interface having a high emergency is firstly performed in a situation having a high emergency. That is, in a case where the vehicle information represents a predetermined emergency state, the SIM interface communicating for emergency support may be enabled to communicate.

Figure 6:
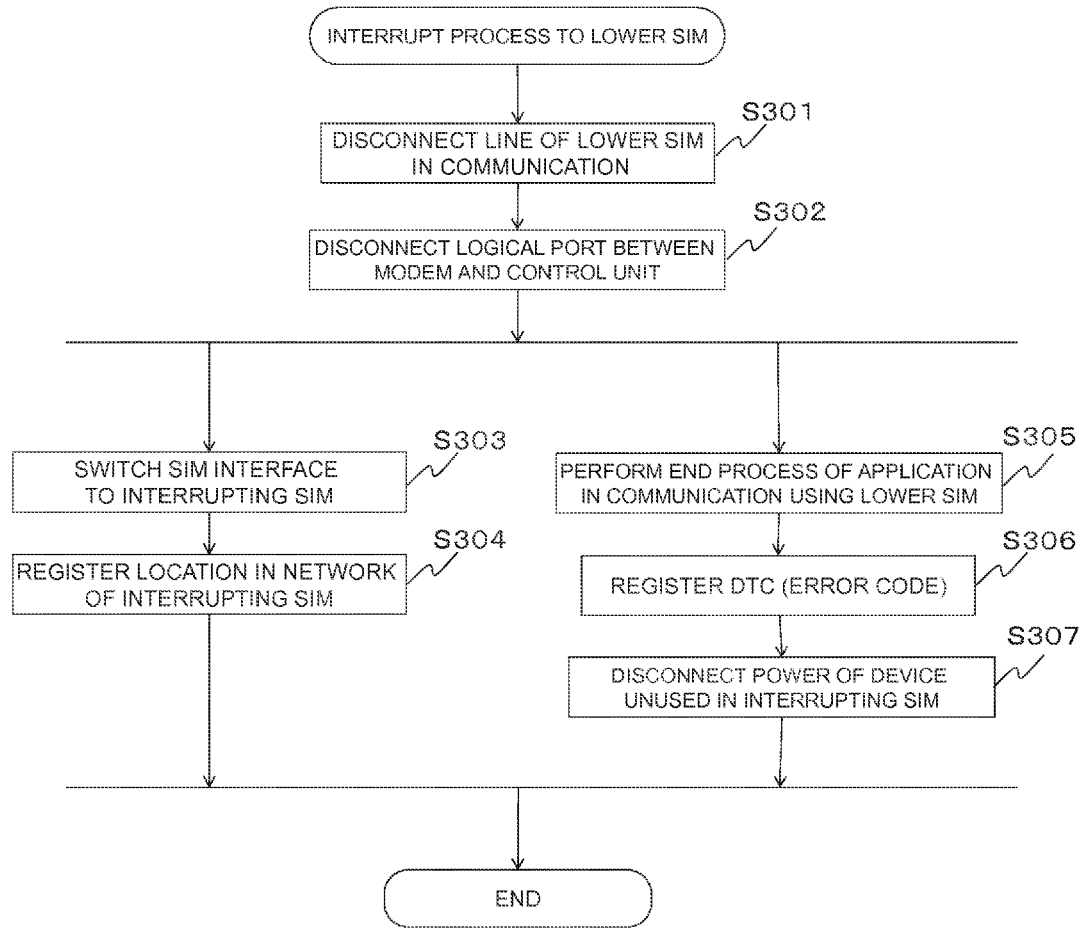
FIG. 6 is a diagram illustrating an interrupt process to a SIM of which the priority is low.

FIG. 6 is a flowchart illustrating the interrupt process to the lower SIM interface performed by the telematics control unit 100. The SIM interface for which the vehicle information satisfies the service start condition 111D is selected by the control unit 110, and this flow is started at a proper time after the other devices connected to the telematics control unit 100 and the vehicle bus 200 are operated to some extent and after the SIM interface is operated to communicate by the SIM selecting process, in a case where the SIM interface lower than the selected SIM interface has been already in communication.

First, the control unit 110 disconnects a line of the lower SIM interface which is in communication (Step S301).

The control unit 110 disconnects a logical port between the modem 130 and the control unit 110 (Step S302).

The SIM switching unit 131 switches the SIM interface to the interrupting SIM interface (Step S303). Specifically, the SIM switching unit 131 detaches the lower SIM interface from the modem 130, and interruptingly connects the selected SIM interface to the modem 130.

The SIM switching unit 131 registers a location in a network of the interrupting SIM interface (Step S304). Specifically, the SIM switching unit 131 instructs the interrupted SIM interface to transmit the information of the location registration to the network of the interrupting SIM interface. The interrupted SIM interface receives the location information from the location information receiving unit 140, and transmits the location information as the registration information to a near base station or the like that is a registration information transmission destination.

In addition, the control unit 110 performs processes of Step S305 to Step S307 as described below in parallel with the processes of Step S303 and Step S304.

The control unit 110 performs an end process of an application which is in communication using the lower SIM interface (Step S305). Specifically, the control unit 110 transmits and receives information prompting the process to end, for example, communication end information to and from the application which is using the lower SIM interface that performs the communication disconnected in Step S301.

The control unit 110 registers a DTC (error code) (Step S306). Specifically, the control unit 110 specifies an error code causing that the communication is ended, and registers the error code as the DTC.

The control unit 110 disconnects the power of a device unused in the interrupting SIM interface (Step S307). Specifically, the control unit 110 disconnects the power of an electronic component predetermined for each SIM interface in advance. It is because unnecessary power consumption is removed, for example, in a case of an accident. That is, in a case where the communication based on the SIM interface having a priority lower than that of the interrupting SIM interface is performed, the SIM switching unit 131 disconnects the communication based on the SIM interface which is in communication and starts the communication based on the interrupting SIM interface, whereby the control unit 110 ends the processing unit that is in communication on the basis of the SIM interface having the lower priority.

The above description has been made about the operation of the interrupt process to the lower SIM interface. According to the operation of the interrupt process to the lower SIM interface, the process of switching the SIM interface and the process of ending the application which is in communication are performed in parallel to performing the SIM interrupting process, and thus it is possible to rapidly perform the interruption as compared with the process of waiting for the ending process of the application and switching the SIM interface.

Figure 7:
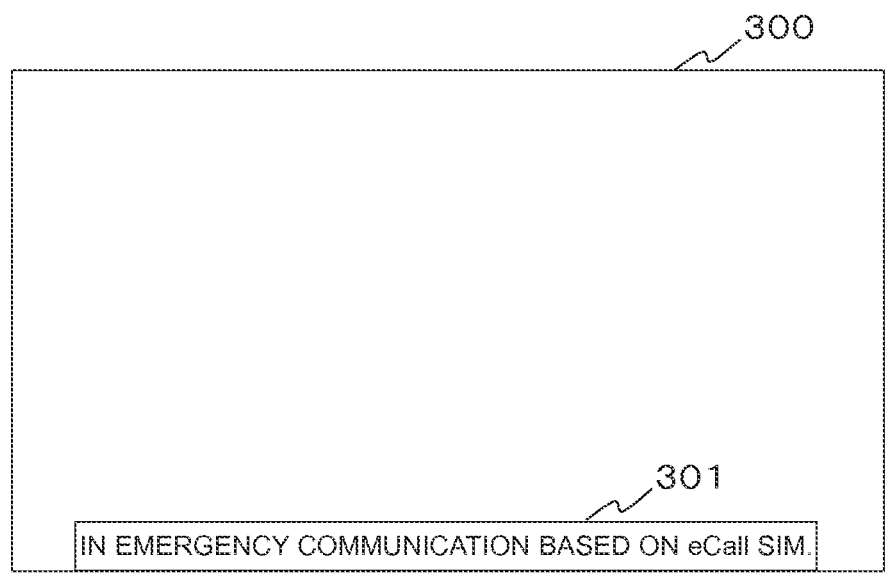
FIG. 7 is a diagram illustrating an example of a screen display showing a state of use of a SIM for emergency support.

FIG. 7 is a diagram illustrating an example of a screen output to an output device in a case where the telematics control unit is connected to an apparatus having the output device such as a display to output an output screen. More specifically, it is a diagram illustrating an example of a screen display 300 representing a state where the eCall SIM interface that is the SIM interface for emergency support is used. In the screen display 300, a message area 301 is displayed in which a message such as "In emergency communication based on eCall SIM" with horizontal texts at a lower end of the screen is displayed. In addition, the message area 301 is not limited to the lower end of the screen, but may be disposed at an upper end, a left end, a right end, a center, or other predetermined positions, or may be displayed to be overlapped with the display screen of the output device. For example, the message area 301 may be displayed to transparently overlap at the lower end of a map display screen of a navigation device.

Figure 8:
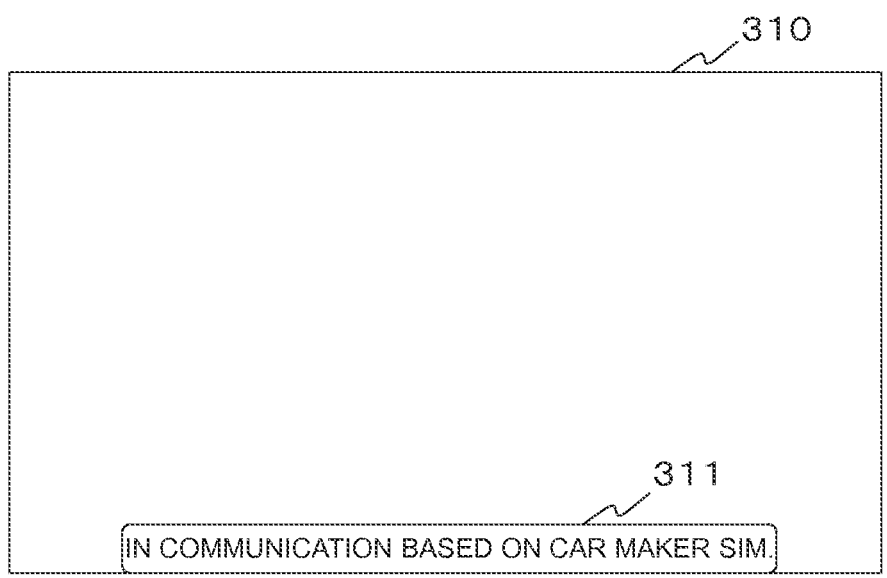
FIG. 8 is a diagram illustrating an example of a screen display showing a state of use of a SIM for a car maker.

FIG. 8 is a diagram illustrating, in a case where the telematics control unit is connected to an apparatus having an output device such as a display to output an output screen, an example of a screen output to the output device. More specifically, it is a diagram illustrating an example of a screen display 310 representing a state where a SIM interface for receiving an information service independently provided by a car maker or the like is being used. As for the screen display 310, a message area 311 is displayed in which a message such as "In communication based on car maker SIM" with horizontal texts at a lower end of the screen is displayed. In addition, the message area 311 is not limited to the lower end of the screen, but may be disposed at an upper end, a left end, a right end, a center, or other predetermined positions, and may be displayed to overlap with the display screen of the output device. For example, the message area 311 may be displayed to be transparently overlapped at the lower end of a map display screen of a navigation device.

In addition, in a case where communication using the SVT SIM interface used in a stolen vehicle tracking system is being performed, it is preferable that the display such as the message areas 301 and 311 be not output. The reason is because the existence of the SVT SIM interface is known and it may be released by destruction or the like of the SIM interface.

The above description has been made about the first embodiment of the telematics control unit according to the present invention. According to the first embodiment, the telematics control unit enables the SIM interface to be selected more appropriately. However, the present invention is not limited to the embodiment described above. The first embodiment described above may be variously modified within the technical sprit of the present invention.

Hereinafter, a second embodiment according to the present invention will be described. In the second embodiment, the present invention is achieved by an application to a navigation device 500.

Figure 9:
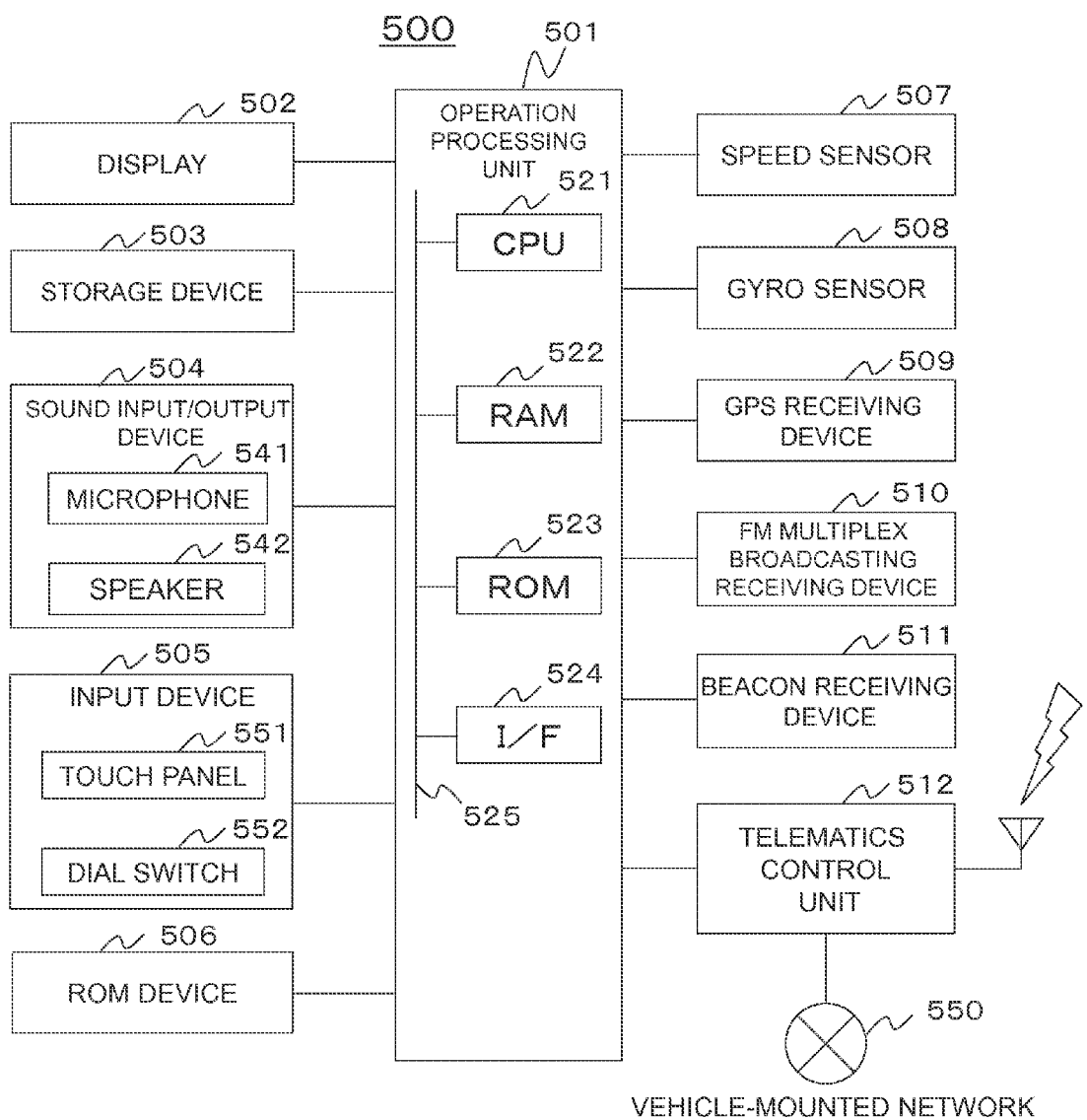
FIG. 9 is a diagram schematically illustrating a configuration of a navigation device according to a second embodiment.

FIG. 9 is a diagram illustrating an overall configuration of the navigation device 500 according to the second embodiment.

In addition, in the embodiment, although the navigation device is employed for the convenience of explanation, the present invention is not limited thereto, and a multifunctional communication device such as a so-called vehicle-mounted device that performs various controls of a vehicle may be employed.

The navigation device 500 is a so-called navigation device capable of indicating a spot representing a present location of the navigation device 500 and information for guiding along a route to a predetermined destination by displaying map information.

The navigation device 500 includes an operation processing unit 501, a display 502, a storage device 503, a sound input/output device 504 (including a microphone 541 as a sound input device and a speaker 542 as a sound output device), an input device 505 (including at least any one of a touch panel 551 and a dial switch 552), a ROM device 506, a vehicle speed sensor 507, a gyro sensor 508, a GPS receiving device 509, an FM multiplex broadcasting receiving device 510, a beacon receiving device 511, and a telematics control unit 512.

The operation processing unit 501 is a central unit that performs various processes. For example, the present location is calculated on the basis of information output from various sensors 507 and 508, the GPS receiving device 509, the FM multiplex broadcasting receiving device 510, and the like. In addition, map data necessary for display is read from the storage device 503 or the ROM device 506 on the basis of the information of the obtained present location.

In addition, the operation processing unit 501 graphically develops the read map data, overlaps a mark representing the present location thereon, and displays it on the display 502. In addition, a recommended route that is an optimal route connecting a departure location or a present location to a destination instructed from a user is searched using the map data or the like stored in the storage device 503 or the ROM device 506. In addition, a user is induced using the speaker 542 or the display 502.

In addition, the operation processing unit 501 receives information specifying a location as an input, and specifies a communication service for which the location is included in a service area. Specifically, the operation processing unit 501 overlaps the input location with the map information stored in the storage device 503 and determines whether the input location is overlapped with communication area information of various communication services, thereby specifying a communication service for which the location is included in a service area. For example, the operation processing unit 501 specifies whether it is within the service area of eCall or specifies whether it is within the service area of ERA Glonass. In addition, the operation processing unit 501 may specify whether it is within the service area of SVT or may specify whether it is within the service area of the communication service using the general-purpose SIM.

The operation processing unit 501 of the navigation device 500 has a configuration in which the respective devices are connected through a bus 525. The operation processing unit 501 includes a CPU 521 that performs various processes such as a numerical operation and a control of the respective devices, a RAM 522 that stores map data and operation data read from the storage device 503 or the ROM device 506, a ROM 523 that stores programs and data, and an I/F 524 for connecting various kinds of hardware units to the operation processing unit 501.

The display 502 is a unit that displays graphic information generated by the operation processing unit 501 or the like. The display 502 includes a liquid crystal display, an organic EL display, and the like.

The storage device 503 includes a storage medium which is at least readable and writable such as a HDD and a nonvolatile memory card.

In the storage medium, map data (including link data of links constituting roads on the map) necessary for a general route searching device and information of a service area about SIM are stored.

Figure 10:
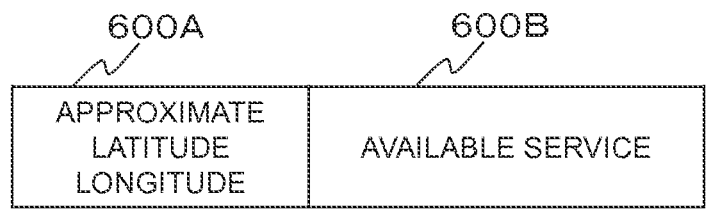
FIG. 10 is a diagram illustrating a data structure of a service area storing unit.

FIG. 10 is a diagram illustrating a data structure of a service area storing unit 600. As illustrated in FIG. 10, in the service area storing unit 600, information of an approximate latitude longitude 600A considered as approximating a predetermined representative spot on the map and a spot around that predetermined representative spot, and an available service 600B in the approximate latitude longitude 600A are associated and stored. That is, considering that the spot included in a predetermined range centered on the location specified by the latitude and longitude specified by the approximate latitude longitude 600A is the location specified by the latitude and longitude specified by the approximate latitude longitude 600A, the available service 600B may be associated.

Returning to FIG. 9, the description is continued. The sound input/output device 504 includes a microphone 541 as a sound input device and a speaker 542 as a sound output device. The microphone 541 acquires an external sound of the navigation device 500 such as a sound of a user or another person.

The speaker 542 outputs a sound message generated by the operation processing unit 501 to the user. The microphone 541 and the speaker 542 may be separately disposed at predetermined positions of environment used by the user, for example, a moving object into which the user gets. However, the microphone 541 and the speaker 542 may be housed in one case. The navigation device 500 may be provided with a plurality of microphones 541 and speakers 542.

The input device 505 is a device that receives an instruction from a user through an operation of the user. The input device 505 includes a touch panel 551 and a dial switch 552, and besides a scroll key, a scale change key, a keyboard, and a software keyboard which are hard switches (not illustrated). In addition, the input device 505 includes a remote controller capable of remotely instructing the navigation device 500 to operate. The remote controller includes a dial switch, a scroll key, a scale change key, and the like, and can transmit information indicating the reception of an operation of each key or switch to the navigation device 500.

The touch panel 551 is mounted on a display side of the display 502, and the display screen can be seen therethrough. The touch panel 551 specifies a touch position corresponding to XY coordinates of an image displayed on the display 502, converts the touch position into coordinates, and outputs the coordinates. The touch panel 551 is configured by a pressure-sensitive or electrostatic input detecting element or the like. In addition, the touch panel 551 may realize a multi-touch capable of simultaneously detecting a plurality of touch positions.

The dial switch 552 is configured to be rotatable clockwise and anticlockwise, generates a pulse signal for each rotation at a predetermined angle, and outputs the pulse signal to the operation processing unit 501. The operation processing unit 501 acquires a rotation angle from the number of pulse signals.

The ROM device 506 is configured by a storage medium which is at least readable, for example, a ROM such as a CD-ROM or a DVD-ROM, and an Integrated Circuit (IC) card. In the storage medium, for example, video data and sound data are stored. The vehicle speed sensor 507, the gyro sensor 508, and the GPS receiving device 509 are used to detect the present location (for example, a vehicle position) by the navigation device 500. The vehicle speed sensor 507 is a sensor that outputs a value used to calculate a movement speed, that is, a vehicle speed. The gyro sensor 508 is configured by an optical-fiber gyro device or a vibration gyro device to detect an angular speed based on rotation of the navigation device 500. The GPS receiving device 509 receives signals from GPS satellites, and measures distances from the GPS satellites and change rates of the distances for three or more satellites by the navigation device 500, thereby measuring a present location, a movement speed, and a movement direction of the moving object. In addition, the GPS receiving device 509 is not limited to the GPS, but may measure a location using a satellite such as Glonass, or may raise precision in measuring a location using the GPS and Glonass together.

The FM multiplex broadcasting receiving device 510 receives FM multiplex broadcasting signals transmitted from the FM broadcasting station. The FM multiplex broadcasting includes schematic status traffic information of Vehicle Information Communication System (VICS: Registered Trademark) information, regulation information, Service Area/Parking Area (SA/PA) information, parking lot information, weather information, and text information provided as FM multiplex general information by a radio station.

The beacon receiving device 511 receives the schematic status traffic information of the VICS information or the like, the regulation information, the Service Area/Parking Area (SA/PA) information, the parking lot information, the weather information, or an emergency alert. For example, it is a device receiving an optical beacon communicating by light and an electric wave beacon communicating by an electric wave.

The telematics control unit 512 switches one or more SIM interfaces to connect the navigation device 500 to a network such as a mobile phone network using any of several SIM interfaces. In addition, the telematics control unit 512 receives an instruction on whether to use which SIM interface from the external operation processing unit 501 or the like, and performs a switching process to use the received SIM interface. In addition, the telematics control unit 512 communicates with another device connected to the vehicle-mounted network 550 such as CAN through which the vehicle information is transmitted and received.

Figure 11:
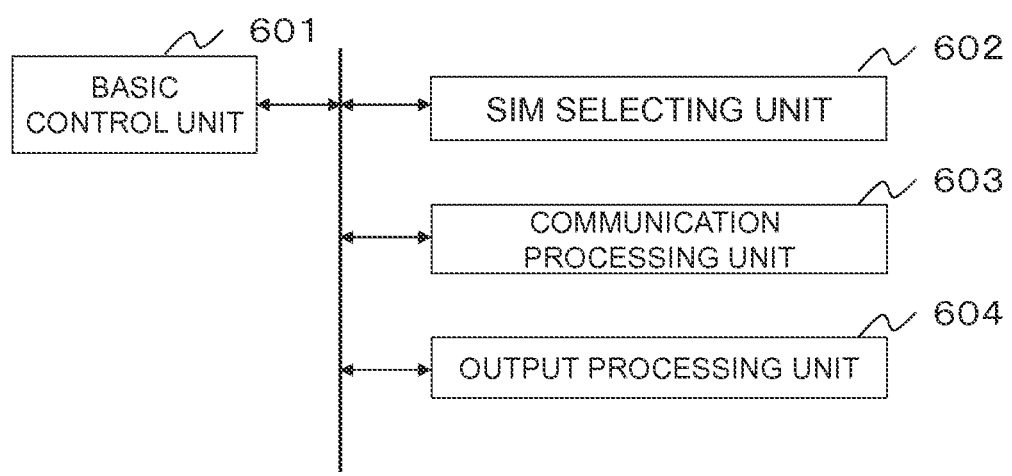
FIG. 11 is a functional block diagram of an operation processing unit of the navigation device.

FIG. 11 is a functional block diagram of the operation processing unit 501. As illustrated in the drawing, the operation processing unit 501 includes a basic control unit 601, a SIM selecting unit 602, a communication processing unit 603, and an output processing unit 604.

The basic control unit 601 is a central functional unit that performs various processes, and controls the other processing units according to the processing content. In addition, information of various sensors and the GPS receiving device 509 is acquired, and a map matching process or the like is performed to specify the present location. In addition, at any time, driving date and time are associated with a location, and a movement history is stored in the storage device 503 for each link constituting a road. In addition, the present time is output in response to a request from each processing unit.

In addition, the basic control unit 601 searches an optimal route (a recommended route) connecting the present location to the destination. In the route searching, using a route searching logic such as Dijkstra's algorithm, a route of minimizing a link cost is searched on the basis of a preset link cost for a predetermined section (link) of a road.

In addition, the basic control unit 601 induces a user through visual and auditory senses using the speaker 542 and the display 502 while displaying the recommended route such that the present location does not deviate from the recommended route.

The SIM selecting unit 602 selects the SIM interface to be used according to the vehicle situation of the vehicle mounted with the navigation device 500. In addition, the start/end of the communication using the SIM interface is controlled. In addition, in a case where interrupt into the SIM interface having the lower priority occurs, a control such as continuation and disconnection of the line of the SIM interface is performed.

In addition, the SIM selecting unit 602 receives the information specifying a location, and specifies a communication service for which the location is included in the service area. Specifically, the operation processing unit 501 overlaps the input location with the map information stored in the storage device 503 to determine whether the input location is overlapped with the communication area information of various communication services, thereby specifying the communication service for which the location is included in the service area. For example, the operation processing unit 501 specifies whether it is within the service area of eCall or specifies whether it is within the service area of ERA Glonass. In addition, the operation processing unit 501 may specify whether it is within the service area of SVT, and may specify whether it is within the service area of the communication service using the general-purpose SIM interface.

The communication processing unit 603 performs the communication process using the SIM interface selected by the SIM selecting unit 602 or a dedicated SIM interface for each service. According to the communication process, the navigation device 500 firstly performs the communication of the higher SIM interface having a higher emergency in a situation of high emergency, since the communication based on the SIM interface having a high priority is preferentially performed.

The output processing unit 604 receives information constituting a screen to be displayed, for example, polygonal information, converts the information into a signal for drawing the information on the display 502, and instructs the display 502 to draw information.

The functional units of the operation processing unit 501 described above, that is, the basic control unit 601, the SIM selecting unit 602, the communication processing unit 603, and the output processing unit 604 are constructed by predetermined programs which are read and executed by the CPU 521. For this reason, in the RAM 522, the programs for realizing the processes of the functional units are stored.

In addition, the constituent elements described above are mainly classified according to the processing contents in order to help with understanding on the configuration of the navigation device 500. Therefore, the present invention is not limited by the method of classifying the constituent elements or the names thereof. The configuration of the navigation device 500 may be classified into more constituent elements according to the processes. In addition, it may be classified such that one constituent element performs many processes.

In addition, each functional unit may be constructed by hardware units (ASIC, GPU, and the like). In addition, the process of each functional unit may be performed by one unit of hardware, and may be performed by a plurality of hardware units.

[Description of Operation]

Figure 12:
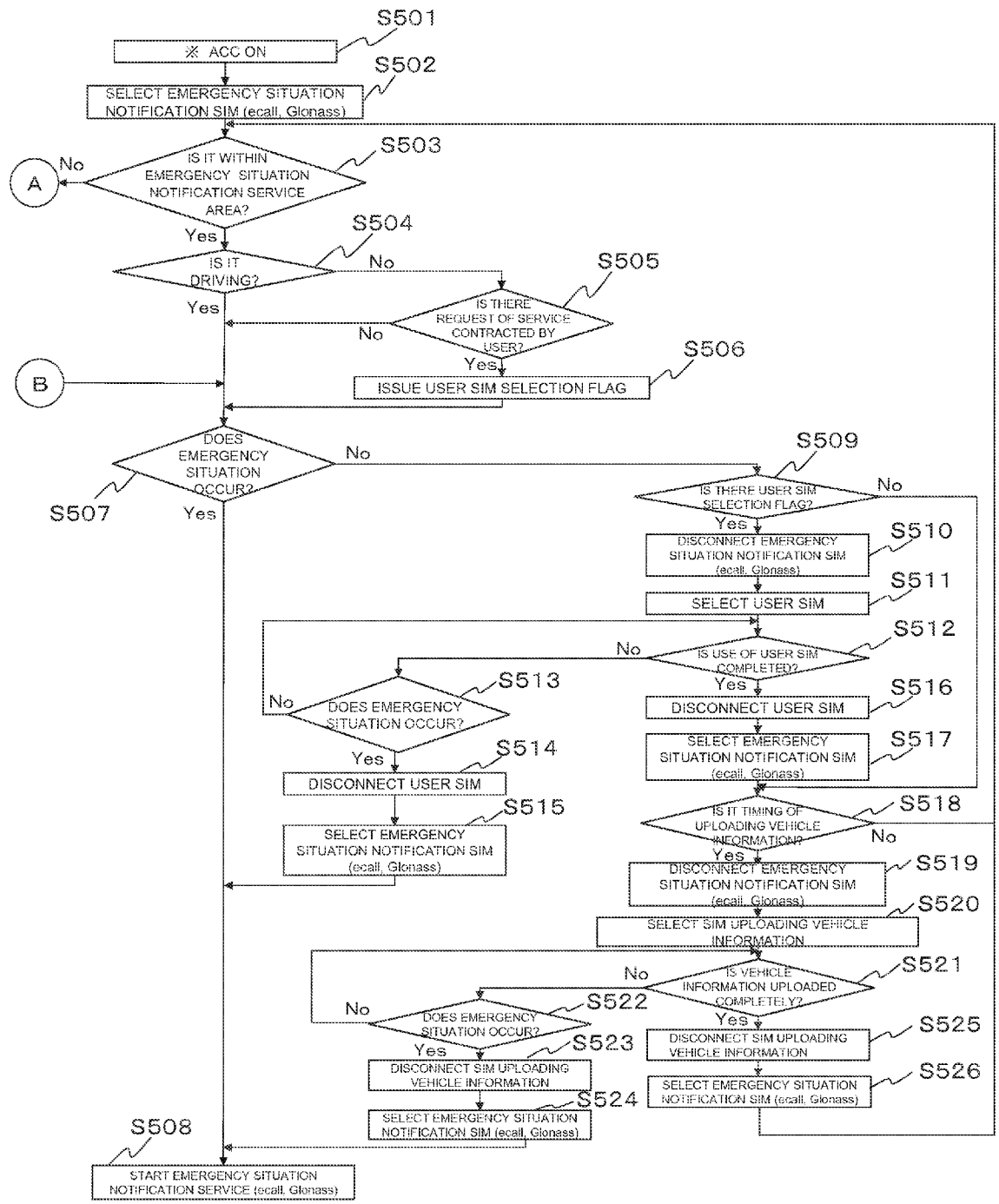
FIG. 12 is a diagram illustrating a part of a flow of a SIM selecting process of the navigation device.
Figure 13:
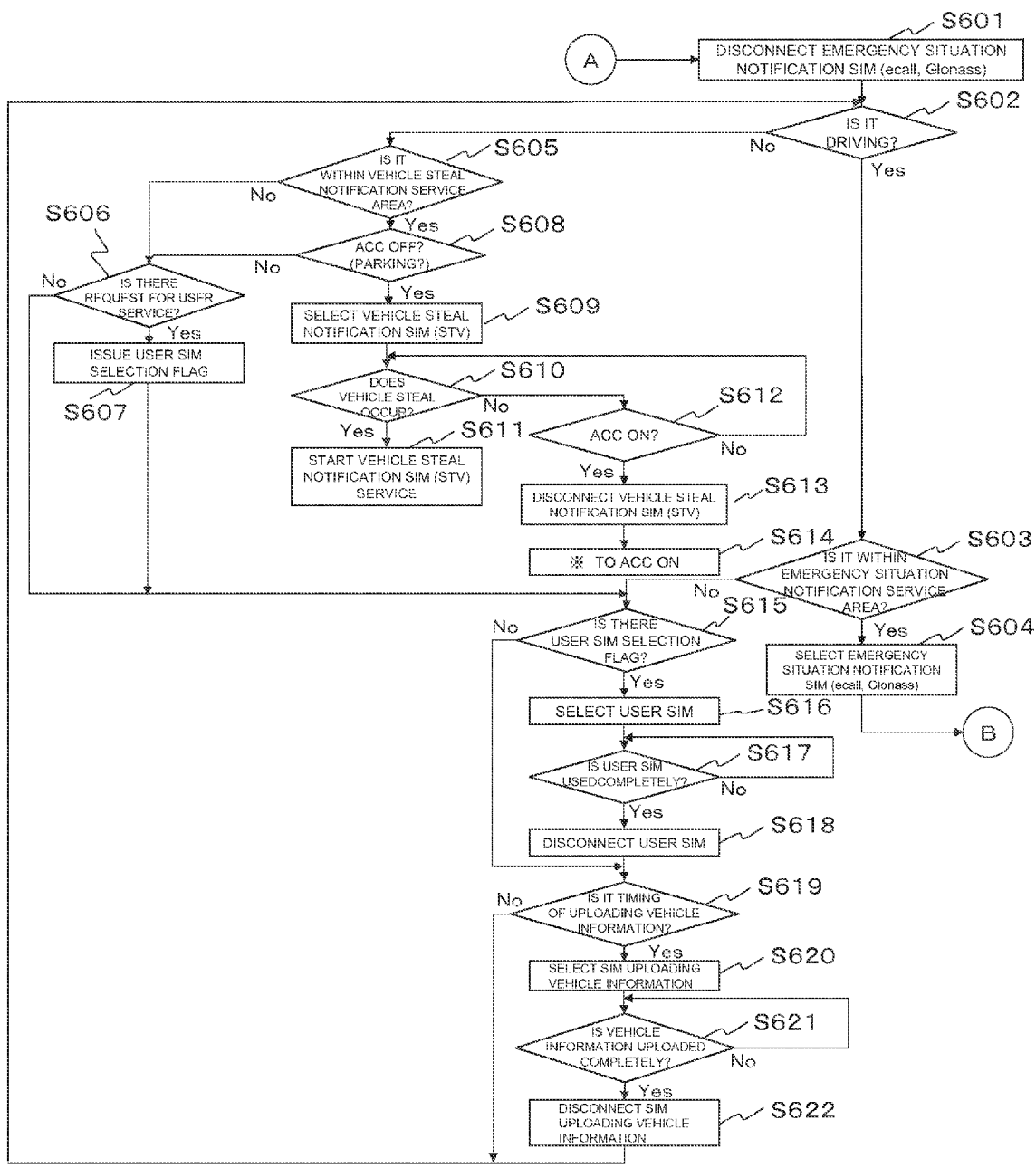
FIG. 13 is a diagram illustrating a part of a flow of the SIM selecting process of the navigation device.

Next, an operation of selecting the SIM interface, which is performed by the navigation device 500, will be described. FIG. 12 and FIG. 13 are flowcharts illustrating a flow of a process of selecting a SIM interface performed by the navigation device 500. This flow is operated after the navigation device 500 is operated.

First, when an accessory power of a vehicle mounted with the navigation device 500 is input (Step S501), the SIM selecting unit 602 selects an emergency situation notification SIM interface (Step S502).

The SIM selecting unit 602 determines whether the present location is within a service area of either eCall or ERA Glonass (Step S503). In a case where it is not within the service area for any service, the process proceeds to Step S601 as described below.

In a case where the present location is within the service area of either eCall or ERA Glonass (Yes in Step S503), the SIM selecting unit 602 determines whether the vehicle mounted with the navigation device 500 is driving (Step S504). Specifically, when a speed of the vehicle obtained from the vehicle speed sensor 507 is equal to or higher than a predetermined value, the SIM selecting unit 602 determines that the vehicle is driving. In a case where it is determined that the vehicle is driving, the process proceeds to Step S507.

In a case where the vehicle is not driving (No in Step S504), the SIM selecting unit 602 determines whether there is a request of communication for a service using a user SIM independently contracted and used by a user within a predetermined period from a predetermined application (Step S505). In a case where there is no request, the process proceeds to Step S507 as described below.

In a case where there is the request (Yes in Step S505), the SIM selecting unit 602 issues a user SIM selection flag (a flag is set) (Step S506).

The SIM selecting unit 602 determines whether a predetermined emergency situation occurs (Step S507). Specifically, the SIM selecting unit 602 determines whether any signal of an emergency notification signal, an airbag open signal, and a signal representing that a detection value of an impact sensor exceeds a threshold value is included in communication contents of a vehicle-mounted network 550 within a predetermined period.

In a case where the emergency situation occurs (Yes in Step S507), the communication processing unit 603 starts an emergency situation notification service (Step S508). Specifically, the communication processing unit 603 starts the communication based on the emergency situation notification service of either eCall or ERA Glonass.

In a case where the emergency situation does not occur (No in Step S507), the SIM selecting unit 602 determines whether there is a user SIM selection flag (whether the flag is set) (Step S509). In a case where there is no flag (the flag is not set), the SIM selecting unit 602 makes the process proceed to Step S518 as described below.

In a case where there is the user SIM selection flag (the flag is set), the SIM selecting unit 602 disconnects the emergency situation notification SIM (Step S510).

The SIM selecting unit 602 selects the user SIM (Step S511).

The communication processing unit 603 communicates using the user SIM, and determines whether the use of the communication using the user SIM is completed (Step S512).

In a case where the use of the communication using the user SIM is not completed (No in Step S512), the SIM selecting unit 602 determines whether a predetermined emergency situation occurs (Step S513). Specifically, the SIM selecting unit 602 determines whether any signal of an emergency notification signal, an airbag open signal, and a signal representing that a detection value of an impact sensor exceeds a threshold value is included in communication contents of a vehicle-mounted network 550 within a predetermined period. In a case where the predetermined emergency situation does not occur, the process is returned to Step S512.

In a case where the emergency situation occurs (Yes in Step S513), the SIM selecting unit 602 disconnects the communication based on the user SIM interface (Step S514).

The SIM selecting unit 602 selects the emergency situation notification SIM interface (Step S515). The process proceeds to Step S508.

In a case where the use of the communication using the user SIM interface is completed (Yes in Step S512), the SIM selecting unit 602 disconnects the communication with the base station based on the user SIM interface (Step S516).

The SIM selecting unit 602 selects the emergency situation notification SIM interface (Step S517).

The SIM selecting unit 602 determines whether it is a timing of uploading vehicle information (Step S518). Specifically, the SIM selecting unit 602 determines whether there is a request of communication for a service using a car maker SIM interface provided by a car maker within a predetermined period from a predetermined application. Then, in a case where it is determined that there is a request, the SIM selecting unit 602 determines that it is the timing of uploading the vehicle information. In a case where it is not the timing of uploading the vehicle information, that is, in a case where there is no request of communication, the process is returned to Step S503.

In a case where it is the timing of uploading the vehicle information (Yes in Step 3518), the SIM selecting unit 602 disconnects the emergency situation notification SIM interface (Step S519).

The SIM selecting unit 602 selects the car maker SIM interface, that is, a SIM interface for uploading the vehicle information (Step S520).

The communication processing unit 603 communicates using the car maker SIM interface, and determines whether the use of the communication using the car maker SIM interface is completed (Step S521). In addition, for example, the communication using the car maker SIM interface is downloading of predetermined update data or uploading of vehicle information representing an operation situation of a vehicle, but is not limited thereto, and includes transmission and reception of various kinds of data.

In a case where the use of the communication using the car maker SIM interface is not completed (No in Step S521), the SIM selecting unit 602 determines whether a predetermined emergency situation occurs (Step S522). Specifically, the SIM selecting unit 602 determines whether any signal of an emergency notification signal, an airbag open signal, and a signal representing that a detection value of an impact sensor exceeds a threshold value is included in communication contents of a vehicle-mounted network 550 within a predetermined period. In a case where the predetermined emergency situation does not occur, the process is returned to Step S521.

In a case where the emergency situation occurs (Yes in Step S522), the SIM selecting unit 602 disconnects the communication based on the car maker SIM interface (Step S523).

The SIM selecting unit 602 selects the emergency situation notification SIM interface (Step S524). The process proceeds to Step S508.

In a case where the use of the communication using the car maker SIM interface is completed (Yes in Step S521), the SIM selecting unit 602 disconnects the communication with the base station based on the car maker SIM interface (Step S525).

The SIM selecting unit 602 selects the emergency situation notification SIM interface (Step S526). The process proceeds to Step S503.

Hereinafter, the processes of Step S601 and the subsequent processes illustrated in FIG. 13 will be described. In Step S503 described above, in a case where the present location is not within any service area of eCall and ERA Glonass (No in Step S503), the SIM selecting unit 602 disconnects the emergency situation notification SIM interface (Step S601).

The SIM selecting unit 602 determines whether the vehicle mounted with the navigation device 500 is driving (Step S602). Specifically, when the speed of the vehicle obtained from the vehicle speed sensor 507 is equal to or higher than a predetermined value, the SIM selecting unit 602 determines that the vehicle is driving. In a case where it is determined that the vehicle is not driving, the process proceeds to Step S605 as described below.

In a case where the vehicle is driving (Yes in Step S602), the SIM selecting unit 602 determines whether the present location is within the service area of either eCall or ERA Glonass (Step S603). In a case where the present location is not within the service area for any service, the process proceeds to Step S615 as described below.

In a case where the present location is within the service area of either eCall or ERA Glonass (Yes in Step S603), the SIM selecting unit 602 selects the emergency situation notification SIM interface (Step S604). The process proceeds to Step 3507 described above.

In a case where the vehicle is not driving (No in Step S602), the SIM selecting unit 602 determines whether the present location is within the service area of SVT that is a stolen vehicle tracking system (Step S605).

In a case where the present location is not within the service area of SVT (No in Step S605), the SIM selecting unit 602 determines whether there is a request of communication for a service using a user SIM independently contracted and used by a user, within a predetermined period from a predetermined application (Step S606). In a case where there is no request, the process proceeds to Step S615 as described below.

In a case where there is the request of the communication for the service using the user SIM interface (Yes in Step S606), the SIM selecting unit 602 issues a user SIM selection flag (a flag is set) (S607). The process proceeds to Step S615 as described below.

In a case where the present location is within the service area of SVT (Yes in Step S605), the SIM selecting unit 602 inquiries the basic control unit 601 whether an accessory power of the vehicle mounted with the navigation device 500 is disconnected, and determines whether the power is disconnected, that is, the vehicle is in a parking state (Step S608). In a case where the vehicle is not in the parking state, the SIM selecting unit 602 makes the process proceed to Step S606.

In a case where the accessory power of the vehicle mounted with the navigation device 500 is disconnected, that is, in a case where the vehicle is in the parking state (Yes in Step S608), the SIM selecting unit 602 selects a vehicle steal notification SIM interface, that is, a SIM interface for a stolen vehicle tracking system (Step S609).

The SIM selecting unit 602 determines whether the vehicle steal occurs (Step S610). Specifically, the SIM selecting unit 602 determines whether vehicle steal occurs according to whether a steal occurrence signal emitted from a vehicle steal detecting device (for example, a detection device such as an immobilizer) is transmitted through the vehicle-mounted network 550 within a predetermined period.

In a case where the vehicle steal occurs (Yes in Step S610), the communication processing unit 603 starts the communication based on the vehicle steal notification service (Step S611).

In a case where the vehicle steal does not occur (No in Step S610), the SIM selecting unit 602 inquires the basic control unit 601 whether the accessory power of the vehicle mounted with the navigation device 500 is input so as to determine whether it is in a power-inputting state, that is, a driving state (Step S612). In a case where the accessory power of the vehicle mounted with the navigation device 500 is not input, the SIM selecting unit 602 returns the process to Step S610.

In a case where the accessory power of the vehicle mounted with the navigation device 500 is input (Yes in Step S612), the SIM selecting unit 602 disconnects the communication based on the vehicle steal notification SIM interface (Step S613). The SIM selecting unit 602 returns the process to Step S502 described above (Step S614).

Next, the SIM selecting unit 602 determines whether there is a user SIM selection flag (whether a flag is set) (Step S615). In a case where there is no flag (the flag is not set), the SIM selecting unit 602 makes the process proceed to Step S619 as described below.

In a case where there is the user SIM selection flag (the flag is set), the SIM selecting unit 602 selects the user SIM interface (Step S616).

The communication processing unit 603 communicates using the user SIM interface, and determines whether the use of the communication using the user SIM interface is completed (Step S617).

In a case where the use of the communication using the user SIM interface is not completed (No in Step S617), the SIM selecting unit 602 returns the process to Step S617.

In a case where the use of the communication using the user SIM interface is completed (Yes in Step S617), the SIM selecting unit 602 disconnects the communication with the base station based on the user SIM interface (Step S618).

The SIM selecting unit 602 determines whether it is a timing of uploading the vehicle information (Step S619). Specifically, the SIM selecting unit 602 determines whether there is a request of communication for a service using a car maker SIM interface provided by a car maker within a predetermined period from a predetermined application. Then, in a case where it is determined that there is a request, the SIM selecting unit 602 determines that it is the timing of uploading the vehicle information. In a case where it is not the timing of uploading the vehicle information, that is, in a case where there is no request of communication, the process is returned to Step S602.

In a case where it is the timing of uploading the vehicle information (Yes in Step S619), the SIM selecting unit 602 selects the carmaker SIM interface, that is, a SIM interface for uploading the vehicle information (Step S620).

The communication processing unit 603 communicates using the car maker SIM interface, and determines whether the use of the communication using the car maker SIM interface is completed (Step S621). In addition, for example, the communication using the car maker SIM interface is downloading of predetermined update data or uploading of vehicle information representing an operation situation of a vehicle, but is not limited thereto, and includes transmission and reception of various kinds of data.

In a case where the use of the communication using the car maker SIM interface is not completed (No in Step S621), the SIM selecting unit 602 makes the process proceed to Step S621.

In a case where the use of the communication using the car maker SIM interface is completed (Yes in Step S621), the SIM selecting unit 602 disconnects the communication with the base station based on the car maker SIM interface (Step S622). The process is returned to Step S602.

The above description has been made about the operation of selecting the SIM interface performed by the navigation device 500 according to the second embodiment. According to the process of selecting the SIM interface according to the second embodiment, it is determined whether the information specifying the vehicle state satisfies the predetermined communication condition. Then, in a case where the communication condition and the service use condition are satisfied, it is possible to use a service using a proper SIM.

In addition, since the operation according to the second embodiment has been described mainly on the basis of the difference from the first embodiment, the part of performing the same operation as that of the first embodiment are not described, but it is obvious that the same process is performed.

The above description has been made about the second embodiment according to the present invention. According to the second embodiment, it is possible to appropriately select the SIM interface used for communication in the navigation device.

The embodiments of the present invention have been described above with reference to the first embodiment and the second embodiment.

In addition, for example, in the first and the second embodiments, it is described that the number of switchable SIM interfaces is predetermined, but the present invention is not limited thereto, and the number of used SIM interfaces may be freely increased. In such a manner, it is possible to more flexibly use the SIM interfaces.

The present invention has been described mainly with reference to the embodiments. In addition, in the second embodiment, the navigation device 500 has been assumed for description, but the present invention is not limited to the navigation device, and may be applied to all apparatuses capable of acquiring a vehicle state.

REFERENCE SIGNS LIST

100 Telematics control unit
110 Control unit
111 SIM connection condition storing unit
120 Vehicle information acquiring unit
130 Modem
131 SIM switching unit
132 eCall SIM interface
133 ERA Glonass SIM interface
134 SVT SIM interface
135 General-purpose SIM interface
140 Location information receiving unit
150, 160 Antenna
200 Vehicle bus
500 Navigation device
501 Operation processing unit
502 Display
503 Storage device
504 Sound input/output device
505 Input device
506 ROM device
507 Vehicle speed sensor
508 Gyro sensor
509 GPS receiving device
510 FM multiplex broadcasting receiving device
511 Beacon receiving device
512 Telematics control unit
521 CPU 522 RAM
523 ROM
524 I/F
525 Bus
541 Microphone
542 Speaker
551 Touch panel
552 Dial switch
601 Basic control unit
602 SIM selecting unit
603 Communication processing unit
604 Output processing unit
550 Vehicle-mounted network

The invention claimed is:

1. A telematics controller comprising:
a vehicle information collecting unit that collects vehicle information about a vehicle mounted with the telematics controller;
a SIM switching unit that enables one of a plurality of SIM interfaces to communicate; and
a switching instructing unit that instructs the SIM switching unit to switch the SIM interface to a SIM interface associated in advance according to the vehicle information collected by the vehicle information collecting unit;
wherein the SIM interface includes a SIM interface communicating for emergency support, and
the switching instructing unit instructs the SIM switching unit to switch the SIM interface to the SIM interface communicating for emergency support when the vehicle information represents a predetermined emergency state.

2. A telematics controller comprising:
a vehicle information collecting unit that collects vehicle information about a vehicle mounted with the telematics controller;
a SIM switching unit that enables one of a plurality of SIM interfaces to communicate; and
a switching instructing unit that instructs the SIM switching unit to switch the SIM interface to a SIM interface associated in advance according to the vehicle information collected by the vehicle information collecting unit;
wherein the SIM interface includes a plurality of SIM interfaces communicating for emergency support,
the telematics controller comprises a storage unit in which service area information specifying a service available area is stored for each of the SIM interfaces communicating for emergency support, and
the switching instructing unit specifies a SIM interface for which a present location specified by the vehicle information is included in the service available area, and instructs the SIM switching unit to switch the SIM interface to the specified SIM interface.

3. The telematics controller according to claim 2,
wherein priority information specifying priority between one SIM interface and another SIM interface of the SIM interfaces is stored in the storage unit, and
the switching instructing unit specifies a SIM interface communicating with a high priority in communication based on the SIM interface for which a present location specified by the vehicle information is included in the service available area, and instructs the SIM switching unit to switch the SIM interface to the specified SIM interface.

4. The telematics controller according to claim 3,
wherein when the SIM switching unit is instructed to switch the SIM interface to the specified SIM interface while communicating on the basis of the SIM interface having a priority lower than that of the specified SIM interface, the SIM switching unit disconnects the communication based on the communicating SIM interface, starts communication based on the specified SIM interface, and ends a processing unit communicating on the basis of the SIM interface having a lower priority.

5. A telematics control method based on a telematics controller which includes a SIM switching unit that enables one of a plurality of SIM interfaces to communicate, the telematics control method comprising:
a vehicle information collecting step of collecting vehicle information; and
a switching instructing step of instructing the SIM switching unit to switch the SIM interface to a SIM interface associated in advance according to the vehicle information collected in the vehicle information collecting step;
wherein the SIM interface includes a SIM interface communicating for emergency support, and
in the switching instructing step, when the vehicle information represents a predetermined emergency state, the SIM switching unit is instructed to switch the SIM interface to the SIM interface communicating for emergency support.

6. A telematics control method based on a telematics controller which includes a SIM switching unit that enables one of a plurality of SIM interfaces to communicate, the telematics control method comprising:
a vehicle information collecting step of collecting vehicle information; and
a switching instructing step of instructing the SIM switching unit to switch the SIM interface to a SIM interface associated in advance according to the vehicle information collected in the vehicle information collecting step;
wherein the SIM interface includes a plurality of SIM interfaces communicating for emergency support,
the telematics controller includes a storage unit in which service area information specifying a service available area is stored for each of the SIM interfaces communicating for emergency support, and
in the switching instructing step, a SIM interface for which a present location specified by the vehicle information is included in the service available area is specified, and the SIM switching unit is instructed to switch the SIM interface to the specified SIM interface.

7. The telematics control method according to claim 6,
wherein priority information specifying priority between one SIM interface and another SIM interface of the SIM interfaces is stored in the storage unit, and
in the switching instructing step, a SIM interface communicating with a high priority in communication based on the SIM interface for which a present location specified by the vehicle information is included in the service available area is specified, and the SIM switching unit is instructed to switch the SIM interface to the specified SIM interface.

8. The telematics control method according to claim 7,
wherein when the SIM switching unit is instructed to switch the SIM interface to the specified SIM interface while communicating on the basis of the SIM interface having a priority lower than that of the specified SIM interface, the SIM switching unit performs a SIM switching step in which the SIM switching unit disconnects the communication based on the communicating SIM interface, starts communication based on the specified SIM interface, and ends a processing unit communicating on the basis of the SIM interface having a lower priority.

* * * * *